(12) United States Patent
Hsieh et al.

(10) Patent No.: US 11,044,053 B2
(45) Date of Patent: Jun. 22, 2021

(54) DEVICE AND METHOD OF HANDLING CODE BLOCK GROUP-BASED COMMUNICATION OPERATION

(71) Applicant: ACER INCORPORATED, New Taipei (TW)

(72) Inventors: Chia-Wen Hsieh, New Taipei (TW); Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 21 days.

(21) Appl. No.: 16/009,224

(22) Filed: Jun. 15, 2018

(65) Prior Publication Data

US 2018/0367259 A1    Dec. 20, 2018

Related U.S. Application Data

(60) Provisional application No. 62/520,651, filed on Jun. 16, 2017.

(51) Int. Cl.
*H04L 1/18* (2006.01)
*H04L 5/00* (2006.01)
(Continued)

(52) U.S. Cl.
CPC .......... *H04L 1/1812* (2013.01); *H04L 1/0041* (2013.01); *H04L 1/1614* (2013.01);
(Continued)

(58) Field of Classification Search
CPC ... H04L 1/1812; H04L 1/1614; H04L 1/1861; H04L 1/1858; H04L 1/0041;
(Continued)

(56) References Cited

U.S. PATENT DOCUMENTS

2016/0028505 A1* 1/2016 Pi .................. H04L 1/0003
                                                            714/807
2016/0329995 A1   11/2016 Jiang
(Continued)

FOREIGN PATENT DOCUMENTS

CN    105281868 A    1/2016
TW    201538024 A    10/2015

OTHER PUBLICATIONS

HTC, Discussion on CBG-based retransmission, 3GPP TSG RAN WG1 Meeting #89, R1-1708872, May 15-19, 2017, Hangzhou, P.R. China, XP051274055, pp. 1-4.

MediaTek Inc., Discussion on CB grouping principles for CBG-based transmission with single/multi-bit HARQ-ACK feedback, 3GPP TSG RAN WG1 Meeting #89, R1-1707851, May 15-19, 2017, Hangzhou, P.R. China, XP051283965.
(Continued)

*Primary Examiner* — Joshua Kading
(74) *Attorney, Agent, or Firm* — Winston Hsu

(57) ABSTRACT

A communication device for handling a code block group (CBG)-based communication operation comprises at least one storage device; and at least one processing circuit, coupled to the at least one storage device. The at least one storage device stores, and the at least one processing circuit is configured to execute instructions of receiving an indication configuring at least one CBG-based communication operation to the communication device from a network; receiving a maximum number of CBGs in a transport block (TB) for the at least one CBG-based communication operation from the network; and performing the at least one CBG-based communication operation with the network according to the maximum number of CBGs.

41 Claims, 14 Drawing Sheets

(51) Int. Cl.
*H04L 1/00* (2006.01)
*H04W 72/04* (2009.01)
*H04L 1/16* (2006.01)
*H04W 28/04* (2009.01)
*H04W 84/04* (2009.01)

(52) U.S. Cl.
CPC .......... *H04L 1/1858* (2013.01); *H04L 1/1861* (2013.01); *H04L 5/0055* (2013.01); *H04L 5/0094* (2013.01); *H04W 72/042* (2013.01); *H04W 28/04* (2013.01); *H04W 84/042* (2013.01)

(58) Field of Classification Search
CPC ... H04L 1/0063; H04L 5/0094; H04L 5/0055; H04W 72/042; H04W 28/04; H04W 84/042
See application file for complete search history.

(56) References Cited

U.S. PATENT DOCUMENTS

| | | | |
|---|---|---|---|
| 2018/0145797 A1* | 5/2018 | Yeo | H04L 1/1812 |
| 2018/0324816 A1* | 11/2018 | Islam | H04W 72/042 |
| 2019/0181986 A1* | 6/2019 | Kitamura | H04L 1/16 |
| 2019/0253204 A1* | 8/2019 | Takeda | H04L 1/16 |
| 2020/0196335 A1* | 6/2020 | Lei | H04L 1/1896 |
| 2020/0196347 A1* | 6/2020 | Hwang | H04W 72/0446 |

OTHER PUBLICATIONS

Mediatek Inc., eMBB Encoding Chain, 3GPP TSG-RAN WG1 NR, R1-1702732, Feb. 13-17, 2017, Athens, Greece, pp. 1-9, XP051221572.
Huawei, HiSilicon, "Scheduling mechanisms for CBG-based re-transmission", 3GPP TSG RAN WG1 Meeting #89, R1-1706962, Hangzhou, China, May 15-19, 2017.

* cited by examiner

| $M_{CBG\_MAX}$ | $M_{CBG\_ACTUAL}$ | TB size (L) |
|---|---|---|
| 1 | 1 | All TB size |
| 2 | 1 | $L < L_a$ |
| | 2 | $L_a \leq L$ |
| 4 | 1 | $L < L_x$ |
| | 2 | $L_x \leq L < L_y$ |
| | 3 | $L_y \leq L < L_z$ |
| | 4 | $L_z \leq L$ |

FIG. 8

DEVICE AND METHOD OF HANDLING CODE BLOCK GROUP-BASED COMMUNICATION OPERATION

CROSS REFERENCE TO RELATED APPLICATIONS

This application claims the benefit of U.S. Provisional Application No. 62/520,651 filed on Jun. 16, 2017, which is incorporated herein by reference.

BACKGROUND OF THE INVENTION

1. Field of the Invention

The present invention relates to a device and a method used in a wireless communication system, and more particularly, to a device and a method of handling a code block group (CBG)-based communication operation.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc. For a UE and an eNB to communicate with each other in the LTE-A system, the UE and the eNB must support standards developed for the LTE-A system, such as the 3GPP Rel-1X standard or later versions.

A code block group (CBG)-based communication operation is proposed to improve (re) transmission efficiency of a hybrid automatic repeat request (HARQ) process by grouping a number of code block(s) into a CBG. Therefore, a transport block (TB) is divided into several CBGs which can be decoded by a UE/next generation Node-B (gNB) individually, and the UE/gNB feeds back hybrid automatic repeat request (HARQ) feedbacks corresponding to the CBGs in the TB. However, it is still unknown how to acknowledge the received CBGs, since only acknowledging of the TB is defined in the 3GPP standard. Communication between the UE and the gNB cannot proceed regularly, if the received CBGs are not acknowledged properly. Thus, a mechanism for handling the CBG-based communication operation is an important problem to be solved.

SUMMARY OF THE INVENTION

The present invention therefore provides a device and method for handling a code block group (CBG)-based communication operation to solve the abovementioned problem.

A communication device for handling a code block group (CBG)-based scheduling comprises at least one storage device; and at least one processing circuit, coupled to the at least one storage device. The at least one storage device stores, and the at least one processing circuit is configured to execute instructions of receiving an indication configuring at least one CBG-based communication operation to the communication device from a network; receiving a maximum number of CBGs in a transport block (TB) for the at least one CBG-based communication operation from the network; and performing the at least one CBG-based communication operation with the network according to the maximum number of CBGs.

A network for handling a code block group (CBG)-based communication operation, comprises at least one storage device; and at least one processing circuit, coupled to the at least one storage device. The at least one storage device stores, and the at least one processing circuit is configured to execute instructions of transmitting an indication configuring at least one CBG-based communication operation to a communication device; transmitting a maximum number of CBGs in a transport block (TB) for the at least one CBG-based communication operation; and performing the at least one CBG-based communication operation with the communication device according to the maximum number of CBGs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a schematic diagram of a determination of an actual number of CBGs according to an example of the present invention.

DETAILED DESCRIPTION

Figure 1:
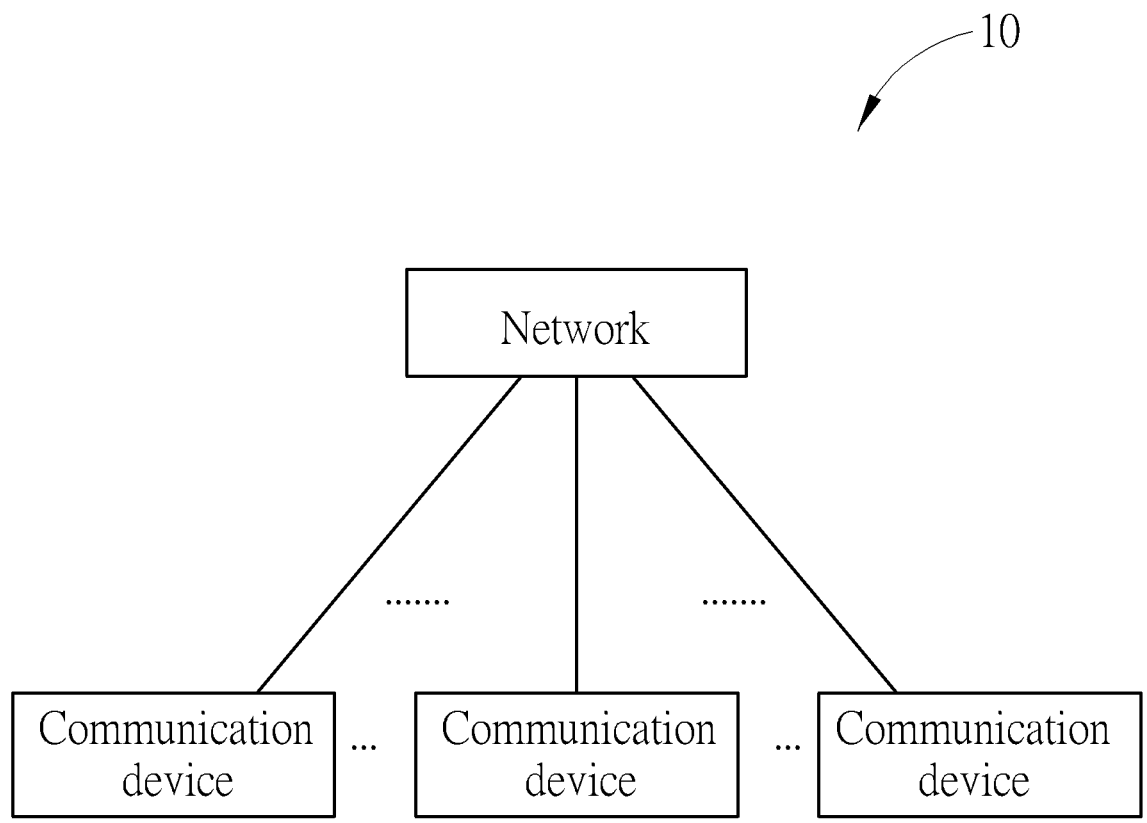
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS).

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which mat billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
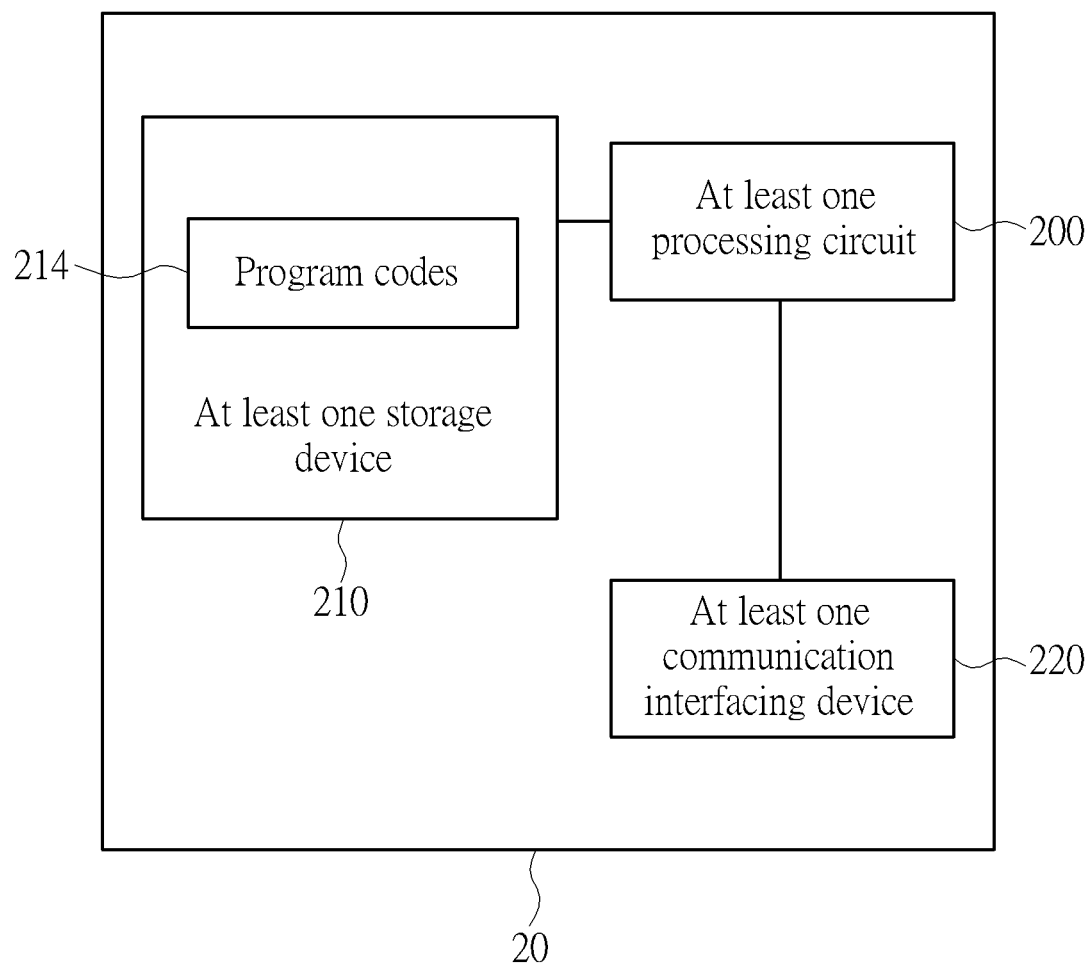
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
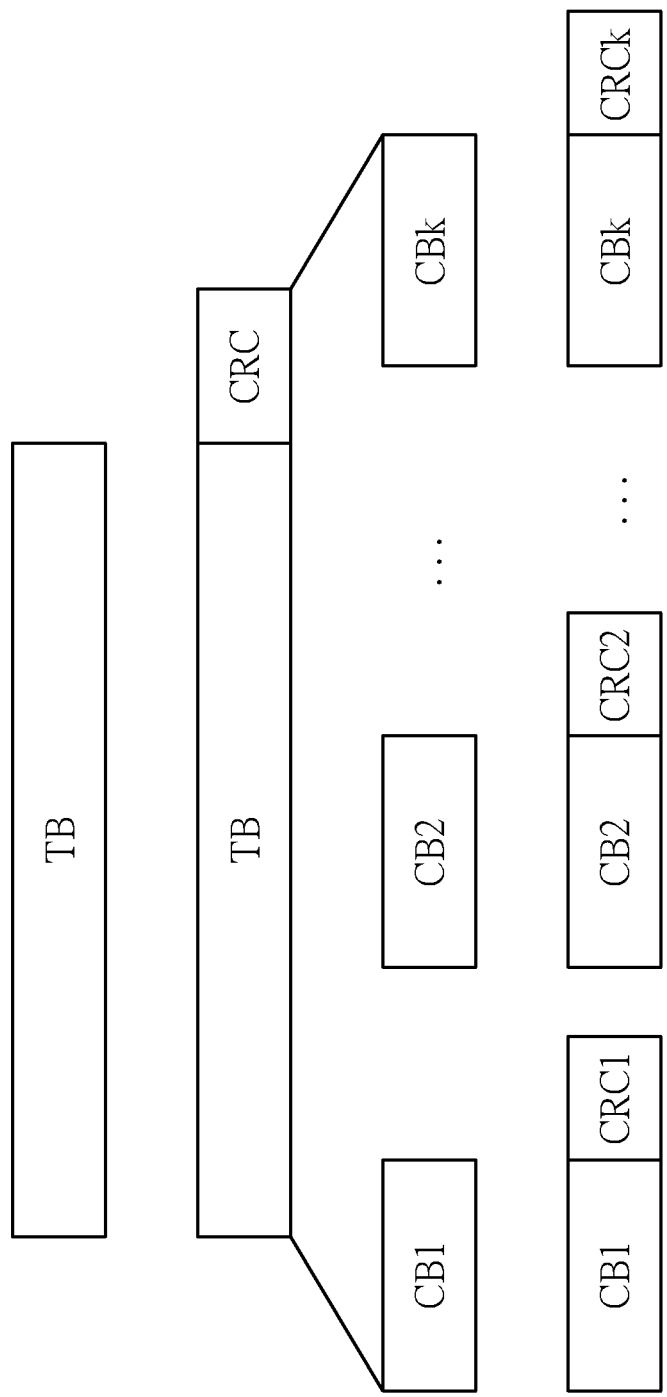
FIG. 3 is a schematic diagram of a TB segmentation according to an example of the present invention.

FIG. 3 is a schematic diagram of a transport block (TB) segmentation according to an example of the present invention. When a transmitter (e.g., a UE) starts to process a TB, the transmitter obtains (e.g., computes) a cyclic redundancy check (CRC) according to the TB, and attaches the TB with the CRC. Further, the TB is divided into code blocks (CBs) CB1-CBk. The transmitter obtains CRCs CRC1-CRCk according to the CBs CB1-CBk, and attaches the CBs CB1-CBk with the CRCs CRC1-CRCk, respectively. Then, the transmitter performs operations such as a channel coding, a rate matching and a CB concatenation on the CBs CB1-CBk with the CRCs CRC1-CRCk.

Figure 4:
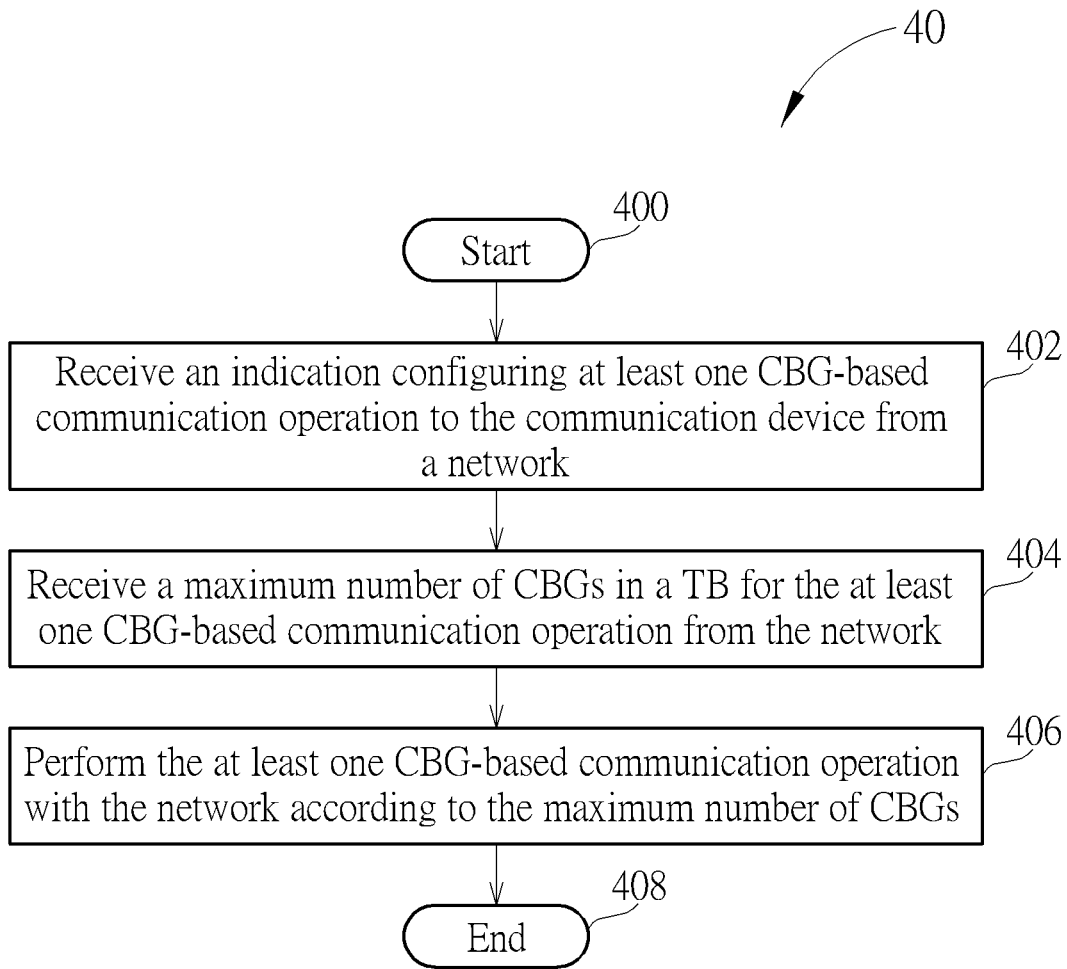
FIG. 4 is a flowchart of a process according to an example of the present invention.

FIG. 4 is a flowchart of a process 40 according to an example of the present invention. The process 40 may be utilized in a communication device, to handle a code block group (CBG)-based communication operation. The process 40 may be compiled into the program codes 214 and includes the following steps:

Step 400: Start.

Step 402: Receive an indication configuring at least one CBG-based communication operation to the communication device from a network.

Step 404: Receive a maximum number of CBGs in a TB for the at least one CBG-based communication operation from the network.

Step 406: Perform the at least one CBG-based communication operation with the network according to the maximum number of CBGs.

Step 408: End.

According to the process 40, the communication device receives an indication configuring at least one CBG-based communication operation to the communication device from a network. The communication device receives a maximum number of CBGs (e.g., number of bits) in a TB for the at least one CBG-based communication operation from the network. Then, the communication device performs the at least one CBG-based communication operation with the network according to the maximum number of CBG. That is, the at least one CBG-based communication operation is performed according to the maximum number of CBGs. The problem that the at least one CBG-based communication operation cannot be performed properly is solved.

Realization of the process 40 is not limited to the above description. The following examples may be applied for realizing the process 40.

In one example, the indication and the maximum number of CBGs are received in a single message (e.g., a signaling). In one example, the at least one CBG-based communication operation comprises a reception of a physical DL shared channel (PDSCH). In one example, the at least one CBG-based communication operation comprises a transmission of a physical UL shared channel (PUSCH). In one example, the maximum number of CBGs is received in a radio resource control (RRC) signaling. That is, the maximum number of CBGs is a configurable value, e.g., semi-statically configured. For example, the maximum number of CBGs is UE-specific, is group-UE specific, and/or is cell-specific. The maximum number of CBGs may be determined according to various system parameter(s), such as a buffer status report, data traffic, a UE category of the communication device, a channel bandwidth, etc.

In one example, the maximum number of CBGs for a UL is a first value (e.g., 2), and the maximum number of CBGs for a DL is a second value (e.g., 4). That is, the maximum numbers of CBGs for the UL and the DL may be independently configured. The maximum number of CBGs may be only configured for either the UL or the DL but not both. In one example, the maximum number of CBGs for a first time period is a first value, and the maximum number of CBGs for a second time period is a second value.

In one example, the communication device obtains a size of a CBG field according to the maximum number of CBGs, and receives the CBG field with the size of the CBG field in a first DL control information (DCI), wherein the CBG field indicates at least one transmitted CBG. Then, the communication device performs the at least one CBG-based communication operation with the network according to the CBG field. In one example, the size of the CBG field is the same as the maximum number of CBGs. In one example, the communication device receives a second DCI indicating a location of the first DCI from the network. In one example, the first DCI is received in a physical DL shared channel (PDSCH), and the second DCI is received in a physical DL control channel (PDCCH). That is, the communication device receives the second DCI in the PDCCH, and then receives the first DCI in the PDSCH according to the second DCI. In short, a two-step method is used for performing the at least one CBG-based communication operation. In one example, the first DCI is received in a PDCCH, e.g., a single-step is used. In this case, the second DCI is not needed.

In one example, the communication device obtains (e.g., determines, derives, calculates) an actual number of CBGs according to a predetermined rule. Then, the communication device performs the at least one CBG-based communication operation with the network according to the maximum number of CBGs and the actual number of CBGs. That is, the actual number of CBGs may not be indicated to the communication device explicitly, but may be obtained implicitly by the communication device. For example, the actual number of CBGs may be obtained according to various system parameter(s), such as a TB size, a UE category of the communication device, a UE capability of the communication device, transmission numerology, a subcarrier spacing, a number of bandwidth parts, and/or a system bandwidth.

In one example, the predetermined rule comprises at least one of a size of the TB, a number of CBs in the TB, the maximum number of CBGs, a user equipment (UE) category of the communication device, a UE capability of the communication device, a transmission numerology, a subcarrier spacing, a number of bandwidth parts and a system bandwidth. In one example, the predetermined rule comprises a minimum of a number of CBs in the TB and the maximum number of CBGs.

In one example, the instruction of performing the at least one CBG-based communication operation with the network according to the maximum number of CBGs includes transmitting a hybrid automatic repeat request (HARQ) feedback with a HARQ feedback payload size related to the maximum number of CBGs to the network, wherein the HARQ feedback indicates at least one decoding result of at least one CBG in the TB. In one example, the HARQ feedback payload size is the same as the maximum number of CBGs. In one example, the HARQ feedback payload size is obtained according to the maximum number of CBGs and a number a plurality of TBs in a HARQ process, if the HARQ process comprises the plurality of TBs. In one example, a plurality of bits of the HARQ feedback for the TB is arranged contiguously. That is, bits of a same HARQ feedback for the TB are grouped together, if there are HARQ feedbacks of multiple TBs. In one example, the rest of the HARQ feedback is padded with at least one bit or is reserved, if an actual number of CBGs is smaller than the maximum number of CBGs. Further, the at least one bit comprises only at least one bit "1", comprises only at least one bit "0", comprises only at least one bit indicating "NACK", or comprises only at least one bit indicating "ACK". "ACK" and "NACK" are abbreviations of acknowledgement and negative acknowledgement, respectively. That is, the rest of the HARQ feedback is padded with the same bit (e.g., either bit "1", bit "0", bit indicating "ACK" or bit indicating "NACK").

In one example, the instruction of performing the at least one CBG-based communication operation with the network according to the maximum number of CBGs includes transmitting a plurality of HARQ feedbacks with a plurality of HARQ feedback payload sizes related to a plurality of maximum numbers of CBGs to the network, wherein the plurality of HARQ feedbacks indicate a plurality of decoding results of a plurality of TBs and are transmitted according to a plurality of contiguous HARQ feedback indices of the plurality of HARQ feedbacks. For example, the plurality of HARQ feedbacks may be transmitted according to contiguous indices {1, 2, 3, 4}.

In one example, the instruction of performing the at least one CBG-based communication operation with the network according to the maximum number of CBGs includes decoding all at least one CBG in the TB correctly, performing a CRC on the TB incorrectly, and transmitting at least one NACK corresponding to the all at least one CBG to the network in response to the TB. That is, it may happen that all the CBG(s) is decoded correctly while the TB is not. In this situation, the communication device indicates to the network that all the CBG(s) is not decoded correctly. Accordingly, the communication device may retransmit all the CBG(s).

In one example, the maximum number of CBGs is applied to a plurality of TBs in the at least one CBG-based communication operation, if the plurality of TBs are comprised in a HARQ process. In one example, if the HARQ process comprises TBs TB1-TBk, the maximum number of CBGs is applied to the TBs TB1-TBk in the at least one CBG-based communication operation. Accordingly, the HARQ feedback payload size for the HARQ process is $k*M_{CBG\_MAX}$.

Figure 5:
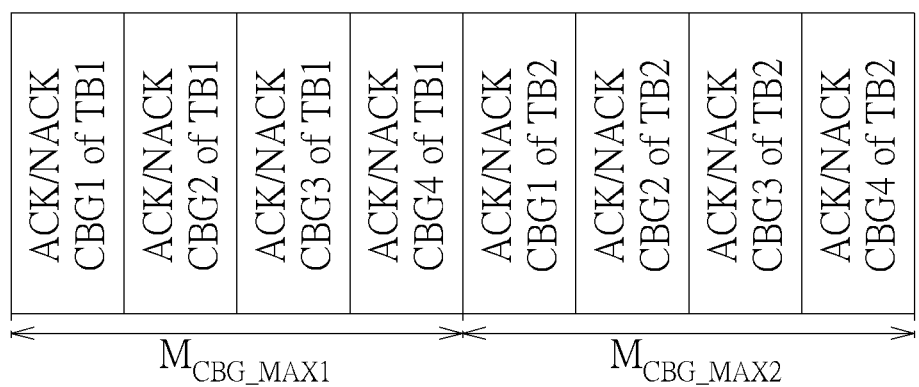
FIG. 5 is a schematic diagram of a CBG-based communication operation for multiple TBs according to an example of the present invention.

FIG. 5 is a schematic diagram of a CBG-based communication operation for multiple TBs according to an example of the present invention. In the present example, a HARQ process comprises 2 TBs TB1-TB2, and the maximum numbers of CBGs $M_{CBG\_MAX1}$ and $M_{CBG\_MAX2}$ for the TBs TB1-TB2 are 4. According to the above description, a HARQ feedback payload size of the HARQ process is 8 (2*4). The first 4 bits (i.e., HARQ feedback for the TB TB1) are used for CBGs in the TB TB1, and the other 4 bits (i.e., HARQ feedback for the TB TB2) are used for CBGs in the TB TB2. That is, the bits of the HARQ feedback for the same TB are arranged contiguously.

Figure 6:
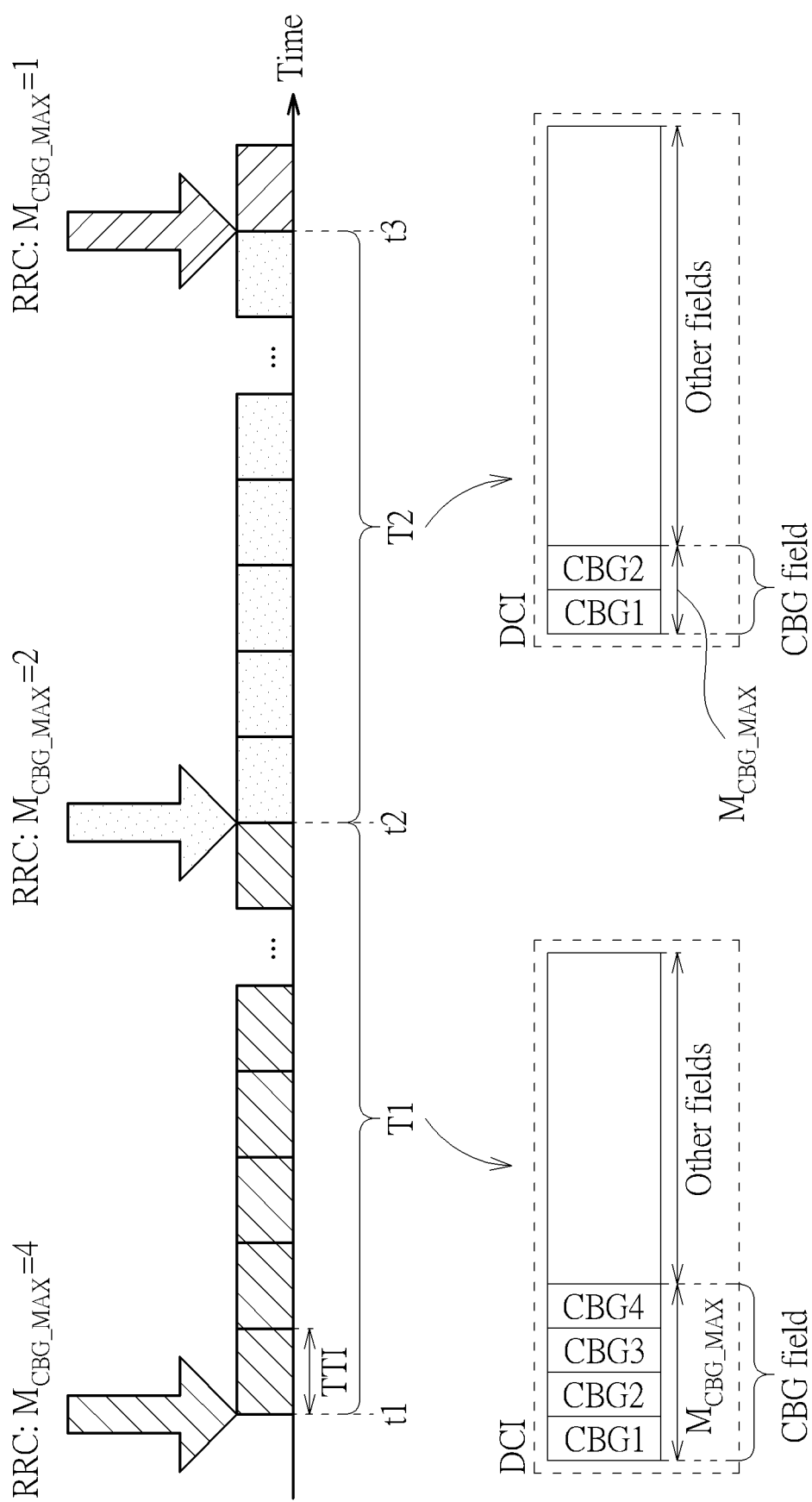
FIG. 6 is a schematic diagram of a CBG-based communication operation according to an example of the present invention.

FIG. 6 is a schematic diagram of a CBG-based communication operation according to an example of the present invention. There are 3 time instants t1-t3 and 2 time intervals T1-T2 in FIG. 6, and a time unit for a communication operation is a transmission time interval (TTI). A communication device receives a first RRC signaling indicating that (e.g., including) a maximum number of CBGs $M_{CBG\_MAX}$ is 4 at the time instant t1. Thus, the communication device understands that 4 bits are reserved for a CBG field in a DCI and are used for the CBG-based communication operation in the following TTIs. In one example, an actual number of CBGs is 4. That is, the CBG field of 4 bits is used for indicating 4 CBGs CBG1-CBG4. Thus, the communication device knows which CBG(s) of the CBGs CBG1-CBG4 is transmitted by the network.

After the time interval T1, the communication device receives a second RRC signaling indicating (e.g., including) that a maximum number of CBGs $M_{CBG\_MAX}$ is 2 at the time instant t2. Thus, the communication device understands that 2 bits are reserved for the CBG field in the DCI and are used for the CBG-based communication operation in the following TTIs. In one example, the actual number of CBGs is 2. That is, the CBG field of 2 bits is used for indicating 2 CBGs CBG1-CBG2. Thus, the communication device knows which CBG(s) of the CBGs CBG1-CBG2 is transmitted by the network.

After the time interval T2, the communication device receives a third RRC signaling indicating (e.g., including) that a maximum number of CBGs $M_{CBG\_MAX}$ is 1 at the time instant t3. The communication device continues the communication operations according to the above description, and is not narrated herein.

Figure 7:
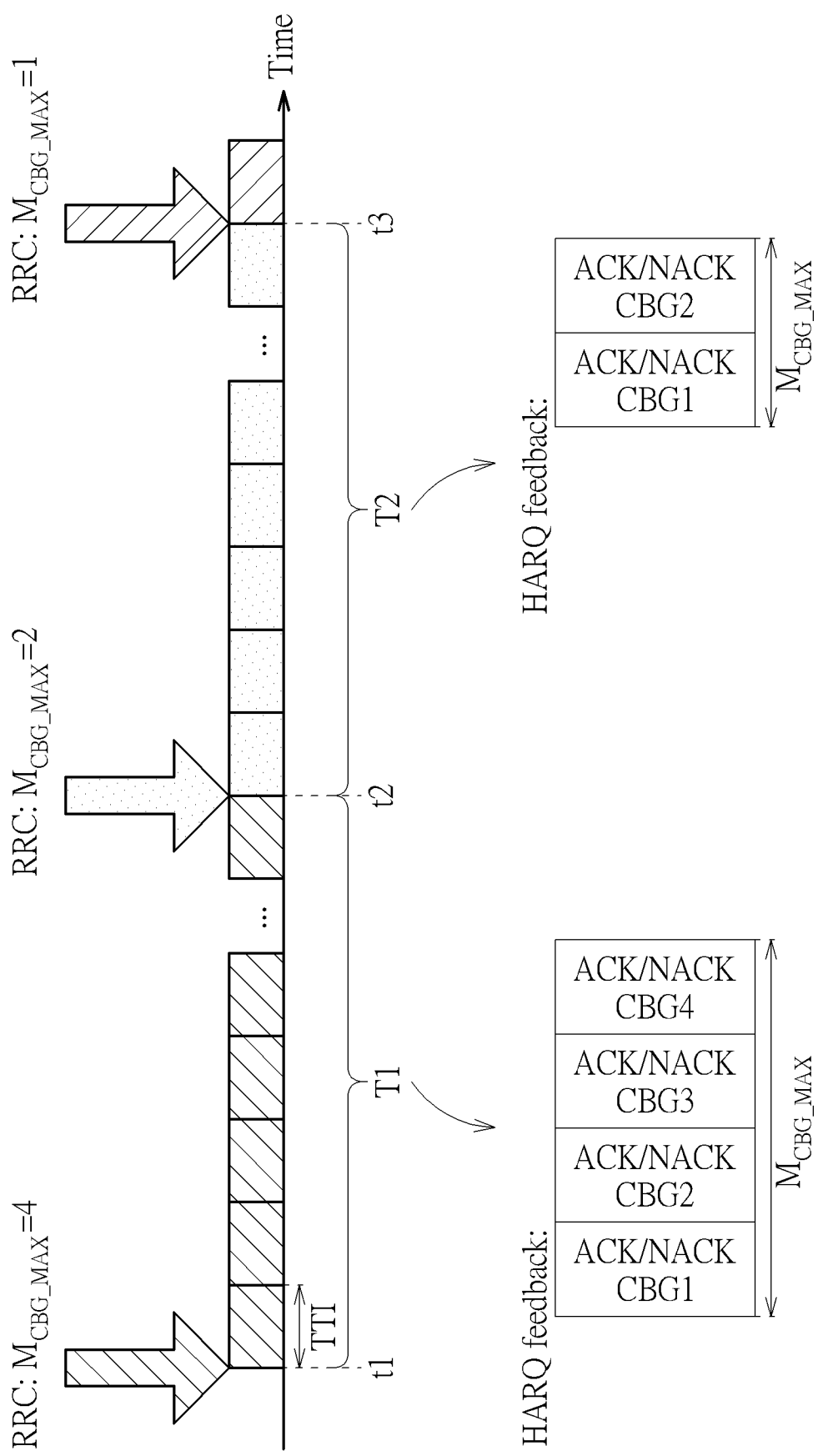
FIG. 7 is a schematic diagram of a CBG-based communication operation according to an example of the present invention.

FIG. 7 is a schematic diagram of a CBG-based communication operation according to an example of the present invention. There are 3 time instants t1-t3 and 2 time intervals T1-T2 in FIG. 7, and a time unit for a communication operation is a TTI. A communication device receives a first RRC signaling indicating (e.g., including) that a maximum number of CBGs $M_{CBG\_MAX}$ is 4 at the time instant t1. Thus, the communication device understands that a HARQ feedback payload size is 4 bits for the CBG-based communication operation in the following TTIs. That is, the 4 bits are used for acknowledging a decoding result of 4 CBGs CBG1-CBG4 in a TB. Thus, the communication device can transmit 4 bits as a HARQ feedback to the network, to indicate whether the CBGs CBG1-CBG4 are correctly received. Note that each of the bits of the HARQ feedback may be an ACK or a NACK.

After the time interval T1, the communication device receives a second RRC signaling indicating (e.g., including) that a maximum number of CBGs $M_{CBG\_MAX}$ is 2 at the time instant t2. Thus, the communication device understands that a HARQ feedback payload size is 2 bits for the CBG-based communication operation in the following TTIs. That is, the 2 bits are used for acknowledging a decoding result of 2 CBGs CBG1-CBG2 in a TB. Thus, the communication device transmits 2 bits as a HARQ feedback to the network, to indicate whether the CBGs CBG1-CBG2 are correctly received.

After the time interval T2, the communication device receives a third RRC signaling indicating (e.g., including) that a maximum number of CBGs $M_{CBG\_MAX}$ is 1 at the time instant t3. The communication device continues the communication operations according to the above description, and is not narrated herein.

FIG. 8 is a schematic diagram of a determination of an actual number of CBGs according to an example of the present invention. Relations between a maximum number of CBGs $M_{CBG\_MAX}$, an actual number of CBGs $M_{CBG\_ACTUAL}$ and a TB size L are shown in FIG. 8. A communication device can obtain (e.g., determine, select) the actual number of CBGs $M_{CBG\_ACTUAL}$ according to the maximum number of CBGs $M_{CBG\_MAX}$ (e.g., received in a RRC signaling), the TB size L (e.g., configured by the network), and thresholds $L_a$, $L_x$, $L_y$, and $L_z$. The thresholds may be predetermined or may be configure by the network. For example, the communication device obtains that the actual number of CBGs $M_{CBG\_ACTUAL}$ is 3, if the maximum number of CBGs $M_{CBG\_MAX}$ is 4 and $L_y \leq L < L_z$ is satisfied.

Figure 9A:
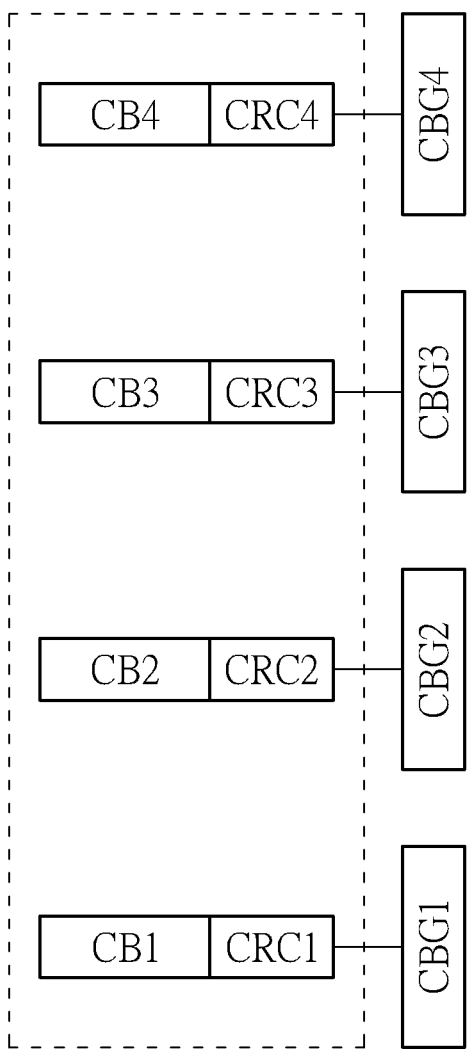
FIGS. 9A and 9B are schematic diagrams of a determination of an actual number of CBGs and arrangements of CBGs according to an example of the present invention.
Figure 9B:
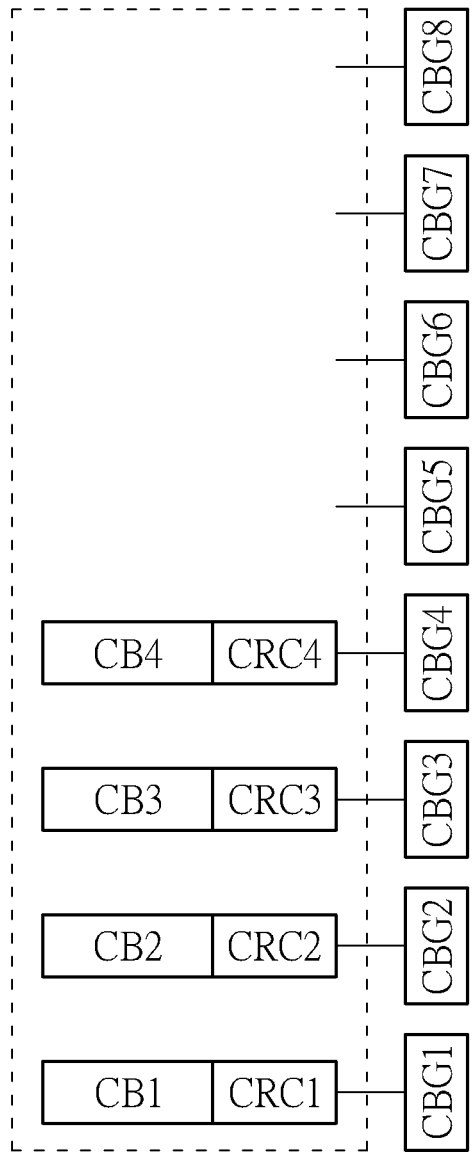

FIGS. 9A and 9B are schematic diagrams of a determination of an actual number of CBGs and arrangements of CBGs according to an example of the present invention. FIGS. 9A and 9B are illustrated for a maximum number of CBGs $M_{CBG\_MAX}$ and an actual number of CBGs $M_{CBG\_ACTUAL}$. A TB is divided into 4 CBs CB1-CB4 with corresponding CRCs CRC1-CRC4. As shown in FIG. 9A, the maximum number of CBGs $M_{CBG\_MAX}$ (e.g., received in a RRC signaling) is 4, and there are 4 CBGs CBG1-CBG4. The CBs CB1-CB4 with the CRCs CRC1-CRC4 are arranged in the CBGs CBG1-CBG4, respectively. That is, each CBG includes only one CB, and accordingly, the actual number of CBGs $M_{CBG\_ACTUAL}$ is 4 since each CBG comprises at least one CB. As shown in FIG. 9B, the maximum number of CBGs $M_{CBG\_MAX}$ (e.g., received in a RRC signaling) is 8, and there are 8 CBGs CBG1-CBG8. The CBs CB1-CB4 with the CRCs CRC1-CRC4 are arranged in the CBGs CBG1-CBG4, respectively. That is, each CBG includes only one CB for the CBGs CBG1-CBG4, while the CBGs CBG5-CBG8 do not include any CB. Although the maximum number of CBGs $M_{CBG\_MAX}$ is 8, the actual number of CBGs $M_{CBG\_ACTUAL}$ is 4 because the CBGs CBG5-CBG8 do not include any CB. In the example, the communication device obtains the actual number of CBGs $M_{CBG\_ACTUAL}$ according to a minimum of a number of CBs in the TB and the maximum number of CBGs $M_{CBG\_MAX}$.

Figure 10A:
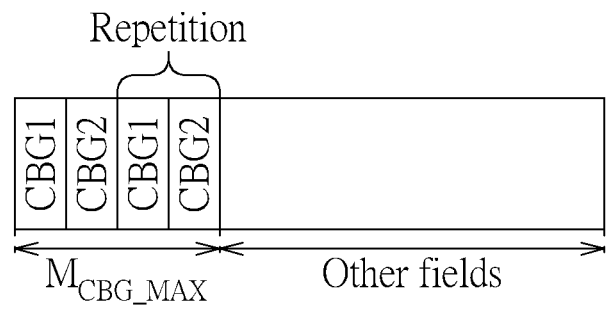
FIGS. 10A-10D are schematic diagrams of a scheduling of CBG-based communication operation according to an example of the present invention.
Figure 10B:
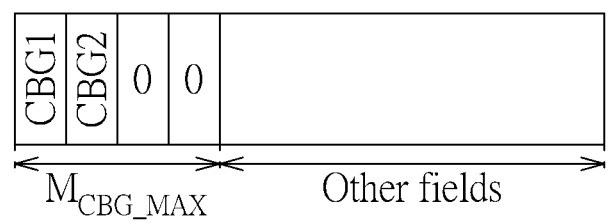
Figure 10C:
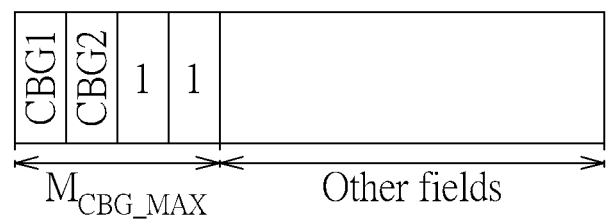
Figure 10D:
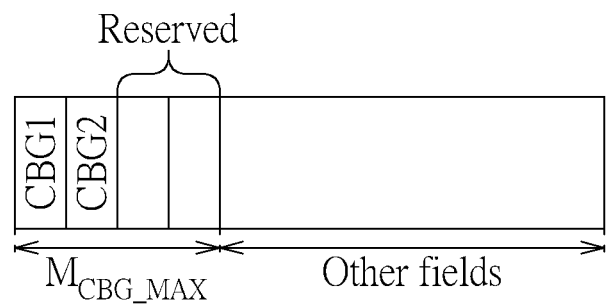

FIGS. 10A-10D are schematic diagrams of a transmission of CBGs according to an example of the present invention. FIGS. 10A-10D are illustrated for a maximum number of CBGs $M_{CBG\_MAX}$ and an actual number of CBGs $M_{CBG\_ACTUAL}$, wherein the actual number of CBGs $M_{CBG\_ACTUAL}$ is smaller than maximum number of CBGs $M_{CBG\_MAX}$. The maximum number of CBGs $M_{CBG\_MAX}$ (e.g., received in a RRC signaling) is 4, which is a size of a CBG field in a DCI. As shown in FIG. 10A, the actual number of CBGs $M_{CBG\_ACTUAL}$ is 2, which is a size of an actual CBG field for CBGs CBG1-CBG2. The actual CBG field occupies a half of the CBG field, while a repetition of the actual CBG field occupies the other half of the CBG field. That is, the actual CBG field is transmitted twice. As shown in FIG. 10B, the actual number of CBGs $M_{CBG\_ACTUAL}$ is 2. The actual CBG field occupies a half of the CBG field, while the other half of the CBG field is padded with bits "0". As shown in FIG. 10C, the actual number of CBGs $M_{CBG\_ACTUAL}$ is 2. The actual CBG field occupies a half of the CBG field, while the other half of the CBG field is padded with bits "1". As shown in FIG. 10D, the actual number of CBGs $M_{CBG\_ACTUAL}$ is 2. The actual CBG field occupies a half of the CBG field, while the other half of the CBG field is reserved (i.e., not used).

Figure 11A:
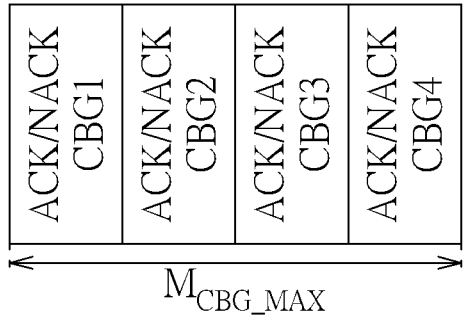
FIGS. 11A-11E are schematic diagrams of a transmission of HARQ feedbacks according to an example of the present invention.
Figure 11D:
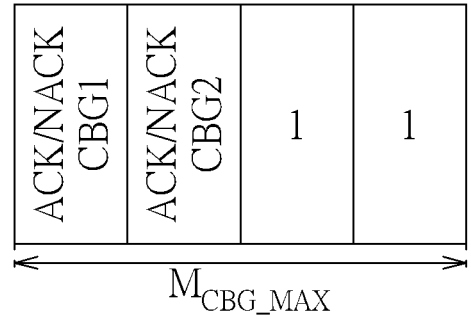
Figure 11B:
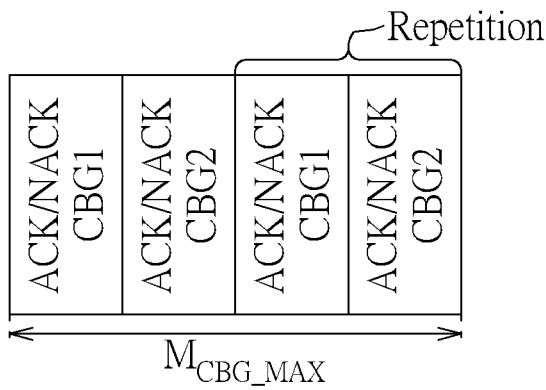
Figure 11E:
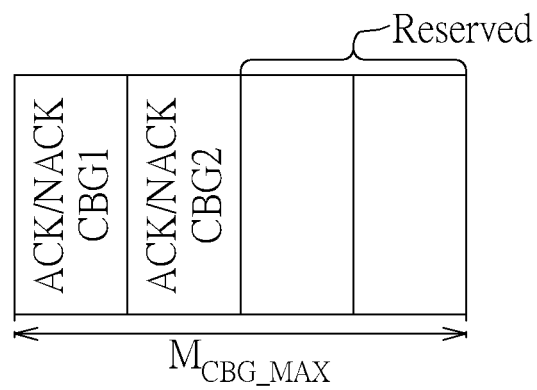
Figure 11C:
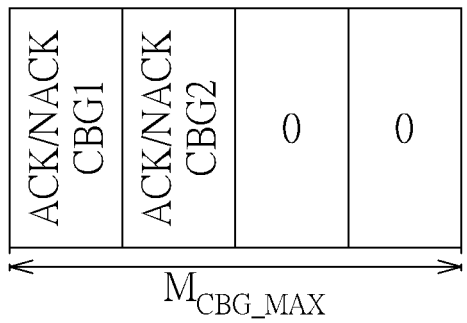

FIGS. 11A-11E are schematic diagrams of a transmission of HARQ feedbacks according to an example of the present invention. FIGS. 11A-11E are illustrated for a maximum number of CBGs $M_{CBG\_MAX}$ and an actual number of CBGs $M_{CBG\_ACTUAL}$. The maximum number of CBGs $M_{CBG\_MAX}$ (e.g., received in a RRC signaling) is 4, which is a HARQ feedback payload size. As shown in FIG. 11A, the actual number of CBGs $M_{CBG\_ACTUAL}$ is also 4. Bits (e.g., ACK or NACK) of a HARQ feedback of CBGs CBG1-CBG4 occupy the entire HARQ feedback payload (i.e., 4 bits). As shown in FIG. 11B, the actual number of CBGs $M_{CBG\_ACTUAL}$ is 2. Bits of the HARQ feedback of the CBGs CBG1-CBG2 occupy a half of the HARQ feedback payload, while a repetition of the bits of the HARQ feedback occupies the other half of the HARQ feedback payload. That is, the bits of the HARQ feedback are transmitted twice. As shown in FIG. 11C, the actual number of CBGs $M_{CBG\_ACTUAL}$ is 2. Bits of the HARQ feedback of the CBGs CBG1-CBG2 occupy a half of the HARQ feedback payload, while the other half of the HARQ feedback payload is padded with bits "0". As shown in FIG. 11D, the actual number of CBGs $M_{CBG\_ACTUAL}$ is 2. Bits of the HARQ feedback of the CBGs CBG1-CBG2 occupy a half of the HARQ feedback payload, while the other half of the HARQ feedback payload is padded with bits "1". As shown in FIG. 11E, the actual number of CBGs $M_{CBG\_ACTUAL}$ is 2. Bits of the HARQ feedback of the CBGs CBG1-CBG2 occupy a half of the HARQ feedback payload, while the other half of the HARQ feedback payload is reserved (i.e., not used).

Figure 12:
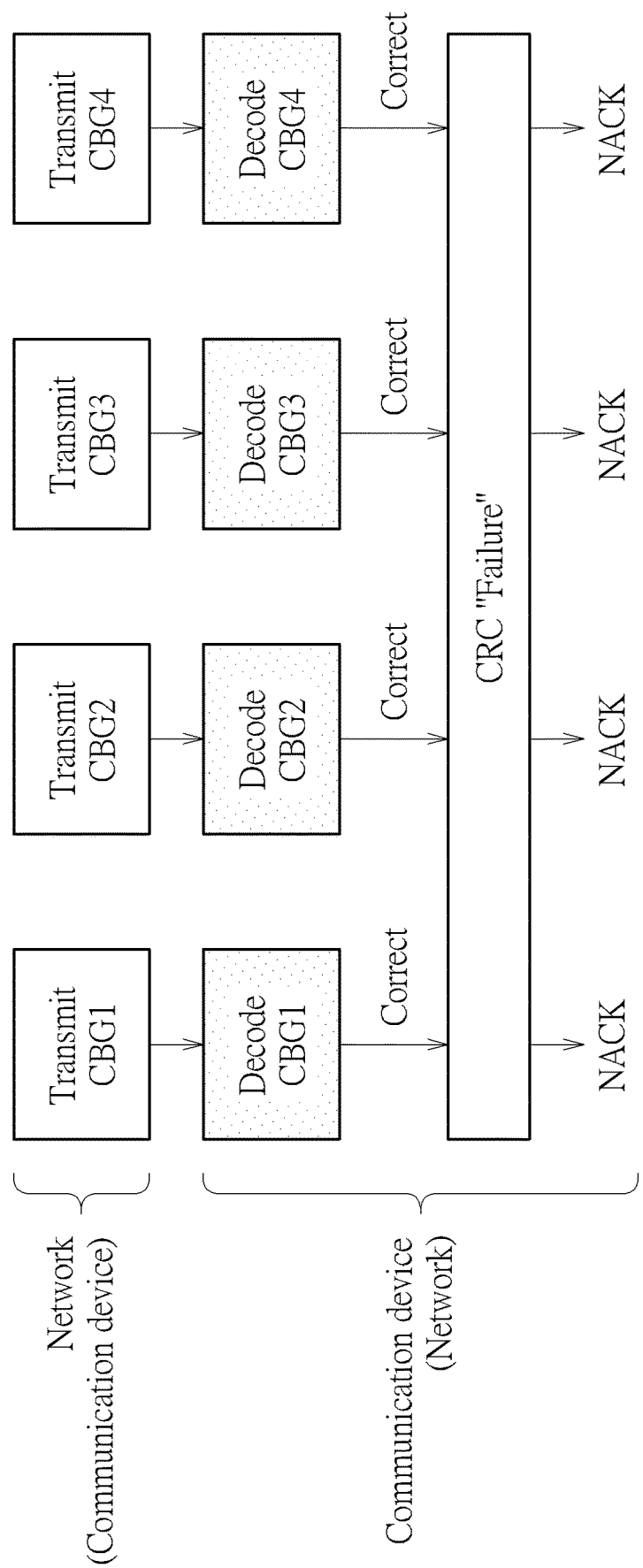
FIG. 12 is a schematic diagram of operations of the network and the communication device according to an example of the present invention.

FIG. 12 is a schematic diagram of operations of the network (or a communication device) and the communication device (or the network) according to an example of the present invention. The network (or the communication device) transmits 4 CBGS CBG1-CBG4 of a TB to the communication device (or the network). The communication device (or the network) decodes the CBGs CBG1-CBG4 correctly, after receiving the CBGs CBG1-CBG4. However, the communication device (or the network) fails to perform a CRC check on the TB successfully (i.e., "failure" is triggered), after the communication device (or the network) combines the CBGs CBG1-CBG4 into the TB. According to the previous description, the communication device (or the network) transmits 4 NACKs (i.e., HARQ feedback) corresponding to the CBGs CBG1-CBG4 to the network (or the communication device), such that the network (or the communication device) can retransmit the CBGs CBG1-CBG4 to the communication device (or the network).

Figure 13:
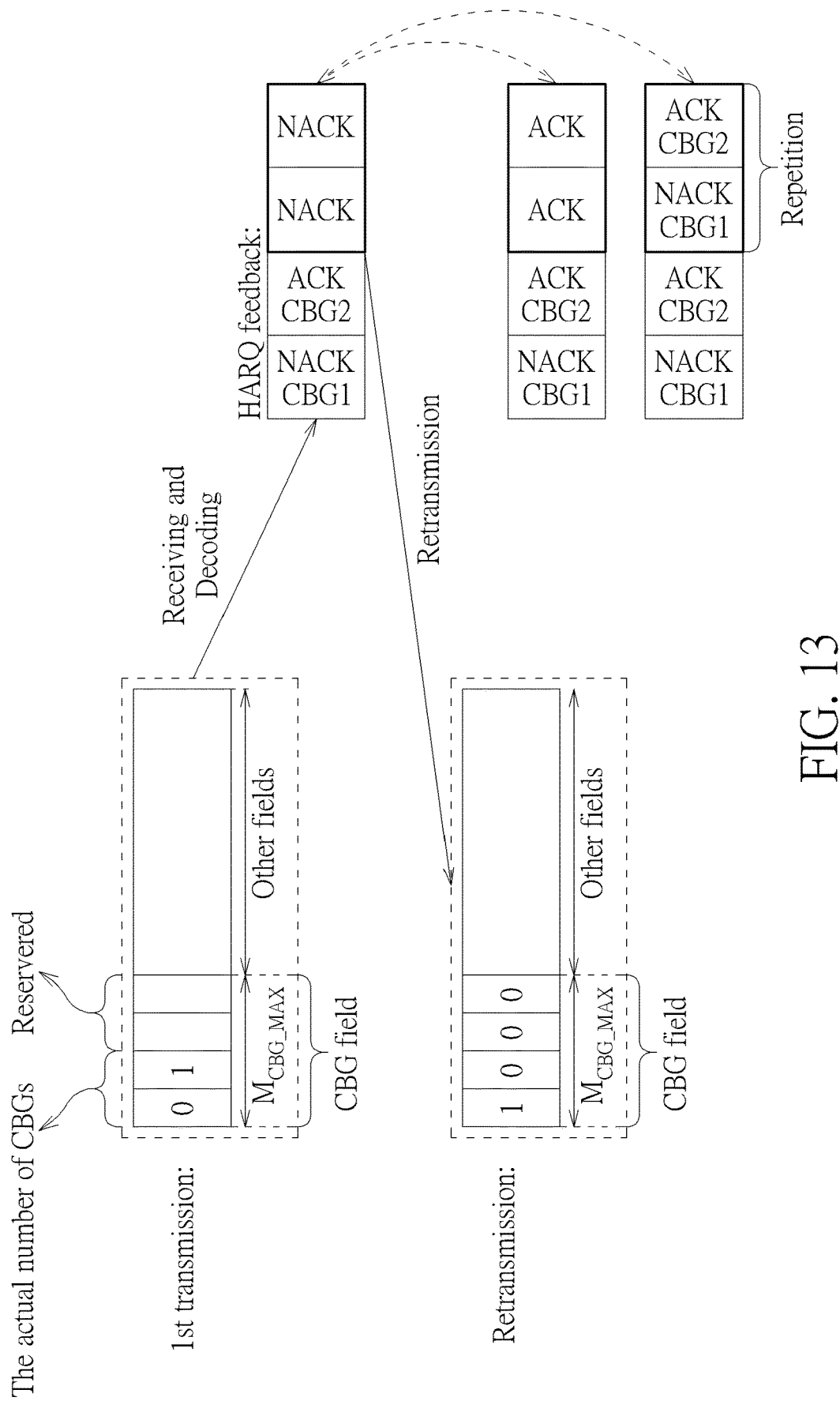
FIG. 13 is a schematic diagram of operations of the network and the communication device according to an example of the present invention.

FIG. 13 is a schematic diagram of operations of the network and a communication device according to an example of the present invention. In the present example, a maximum number of CBGs $M_{CBG\_MAX}$ is 4. In the first transmission, the network transmits bits "0 1" indicating the actual number of CBGs $M_{CBG\_ACTUAL}$ is 2 in a CBG field in a DCI to the communication device, e.g., according to $M_{CBG\_ACTUAL} = \log_2 M_{CBG\_MAX}$. In addition, the rest of the CBG field is reserved (e.g., not used). The network transmits 2 CBGS CBG1-CBG2 of a TB to the communication device according to the CBG field. The communication device decodes the CBGs CBG1-CBG2 and determines that the CBG CBG1 is not received correctly, after receiving the CBGs CBG1-CBG2. The communication device transmits "NACK ACK" (i.e., HARQ feedback) corresponding to the CBGs CBG1-CBG2 to the network, such that the network can retransmit the CBG CBG1. In addition, the communication device transmits the repetition of bit "NACK" in the rest of the CBG field. In another example, the communication device may transmit the repetition of bit "ACK" in the rest of the CBG field. In another example, the communication device may transmit repetitions of the "NACK ACK" in the rest of the CBG field.

In the retransmission, the network transmits bits "1 0" in the CBG field to the communication device, to indicate that the CBG CBG1 is retransmitted, while the rest of the CBG field is padded with bits "0". The communication device decodes the CBG CBG1 again and determines whether the CBG CBG1 is received correctly, after receiving the CBG CBG1. The communication device continues the communication operations according to the above description, and is not narrated herein.

Figure 14:
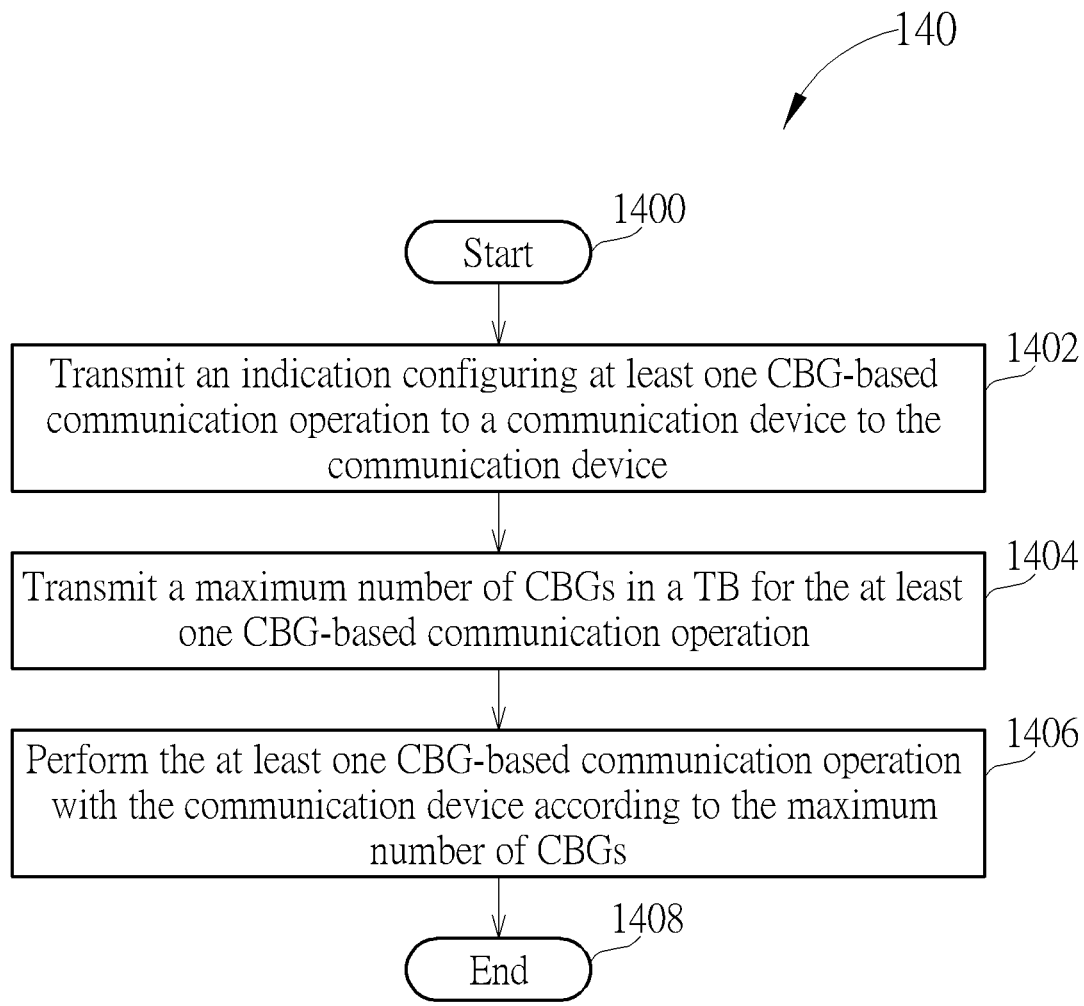
FIG. 14 is a flowchart of a process according to an example of the present invention.

Operations of the network in the above examples can be summarized into a process 140 shown in FIG. 14, and can be compiled into the program codes 214. The process 140 includes the following steps:

Step 1400: Start.

Step 1402: Transmit an indication configuring at least one CBG-based communication operation to a communication device to the communication device.

Step 1404: Transmit a maximum number of CBGs in a TB for the at least one CBG-based communication operation.

Step 1406: Perform the at least one CBG-based communication operation with the communication device according to the maximum number of CBGs.

Step 1408: End.

The operations of the network may be corresponding to the operations of the communication device. The abovementioned examples and FIGS. 4-13 for the communication device can be applied to the network. Examples derived from the abovementioned example are provided as follows.

In one example, the indication and the maximum number of CBGs are transmitted in a single message (e.g., a signaling). In one example, the at least one CBG-based communication operation comprises a transmission of a PDSCH. In one example, the at least one CBG-based communication operation comprises a reception of a PUSCH. In one example, the maximum number of CBGs is transmitted in a RRC signaling. That is, the maximum number of CBGs is a configurable value, e.g., semi-statically configured. For example, the maximum number of CBGs is UE-specific, is group-UE specific, and/or is cell-specific. The maximum number of CBGs may be determined according to various system parameter(s), such as a buffer status report, data traffic, a UE category of the communication device, a channel bandwidth, etc.

In one example, the maximum number of CBGs for a UL is a first value (e.g., 2), and the maximum number of CBGs for a DL is a second value (e.g., 4). That is, the maximum numbers of CBGs for the UL and the DL may be independently configured. The maximum number of CBGs may be only configured for either the UL or the DL but not both. In one example, the maximum number of CBGs for a first time period is a first value, and the maximum number of CBGs for a second time period is a second value.

In one example, the network obtains a size of a CBG field according to the maximum number of CBGs, and transmits the CBG field with the size of the CBG field in a first DL control information (DCI) to the communication device, wherein the CBG field indicates at least one transmitted CBG. Then, the network performs the at least one CBG-based communication operation with the communication device according to the CBG field. In one example, the size of the CBG field is the same as the maximum number of CBGs. In one example, the network transmits a second DCI indicating a location of the first DCI to the communication device. In one example, the first DCI is transmitted in a PDSCH, and the second DCI is transmitted in a PDCCH. That is, the network transmits the second DCI in the PDCCH, and then transmits the first DCI in the PDSCH according to the second DCI. In short, a two-step method is used for performing the at least one CBG-based communication operation. In one example, the first DCI is transmitted in a PDCCH, e.g., a single-step is used. In this case, the second DCI is not needed.

In one example, the network obtains (e.g., determines, derives, calculates) an actual number of CBGs according to a predetermined rule. Then, the network performs the at least one CBG-based communication operation with the communication device according to the maximum number of CBGs and the actual number of CBGs. That is, the actual number of CBGs may not be indicated to the communication device explicitly, but may be obtained implicitly by the communication device. For example, the actual number of CBGs may be obtained according to various system parameter(s), such as a TB size, a UE category of the communication device, a UE capability of the communication device, transmission numerology, a subcarrier spacing, a number of bandwidth parts, and/or a system bandwidth.

In one example, the predetermined rule comprises at least one of a size of the TB, a number of CBs in the TB, the maximum number of CBGs, a user equipment (UE) category of the communication device, a UE capability of the communication device, a transmission numerology, a subcarrier spacing, a number of bandwidth parts and a system bandwidth. In one example, the predetermined rule comprises a minimum of a number of CBs in the TB and the maximum number of CBGs.

In one example, the instruction of performing the at least one CBG-based communication operation with the communication device according to the maximum number of CBGs includes receiving a HARQ feedback with a HARQ feedback payload size related to the maximum number of CBGs, wherein the HARQ feedback indicates at least one decoding result of at least one CBG in the TB. In one example, the HARQ feedback payload size is the same as the maximum number of CBGs. In one example, the HARQ feedback payload size is obtained according to the maximum number of CBGs and a number of a plurality of TBs in a HARQ process, if the HARQ process comprises the plurality of TBs. In one example, a plurality of bits of the HARQ feedback for the TB is arranged contiguously. That is, bits of a same HARQ feedback for the TB are grouped together, if there are HARQ feedbacks of multiple TBs. In one example, the rest of the HARQ feedback is padded with at least one bit or is reserved, if an actual number of CBGs is smaller than the maximum number of CBGs. Further, the at least one bit comprises only at least one bit "1", comprises only at least one bit "0", comprises only at least one bit indicating "NACK", or comprises only at least one bit indicating "ACK". That is, the rest of the HARQ feedback is padded with the same bit (e.g., either bit "1", bit "0", bit indicating "ACK" or bit indicating "NACK").

In one example, the instruction of performing the at least one CBG-based communication operation with the communication device according to the maximum number of CBGs includes receiving a plurality of HARQ feedbacks with a plurality of HARQ feedback payload sizes related to a plurality of maximum numbers of CBGs to the network, wherein the plurality of HARQ feedbacks indicate a plurality of decoding results of a plurality of TBs and are received according to a plurality of contiguous HARQ feedback indices of the plurality of HARQ feedbacks. For example, the plurality of HARQ feedbacks may be received according to contiguous HARQ feedback indices {1, 2, 3, 4}.

In one example, the maximum number of CBGs is applied to a plurality of TBs in the at least one CBG-based communication operation, if the plurality of TBs are comprised in a HARQ process. In one example, if the HARQ process comprises TBs TB1-TBk, the maximum number of CBGs is applied to the TBs TB1-TBk in the at least one CBG-based communication operation. Accordingly, the HARQ feedback payload size for the HARQ process is $k*M_{CBG\_MAX}$.

In one example, a HARQ process comprises 2 TBs TB1-TB2, and the maximum numbers of CBGs $M_{CBG\_MAX1}$ and $M_{CBG\_MAX2}$ for the TBs TB1-TB2 are 4. According to the above description, a HARQ feedback payload size of the HARQ process is 8 (2*4). The first 4 bits (i.e., HARQ feedback for the TB TB1) are used for CBGs in the TB TB1, and the other 4 bits (i.e., HARQ feedback for the TB TB2) are used for CBGs in the TB TB2. That is, the bits for the same TB are arranged contiguously.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a device and method for handling a CBG-based communication operation. A CBG-based communication operation is performed according to the maximum number of CBGs. As a result, the problem that the CBG-based communication operation cannot be performed properly is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a code block group (CBG)-based communication operation, comprising:
   at least one storage device; and
   at least one processing circuit, coupled to the at least one storage device, wherein the at least one storage device stores instructions, and the at least one processing circuit is configured to execute the instructions of:
   receiving an indication configuring at least one CBG-based communication operation to the communication device from a network;
   receiving a maximum limit number of CBGs in a transport block (TB) for the at least one CBG-based communication operation from the network;
   obtaining a size of a CBG field according to the maximum limit number of CBGs;
   receiving the CBG field with the size of the CBG field in a first DL control information (DCI), after obtaining the size of the CBG field, wherein the CBG field indicates at least one transmitted CBG; and
   performing the at least one CBG-based communication operation with the network according to the maximum limit number of CBGs and the CBG field.

2. The communication device of claim 1, wherein the at least one CBG-based communication operation comprises a reception of a physical DL shared channel (PDSCH), or the at least one CBG-based communication operation comprises a transmission of a physical UL shared channel (PUSCH).

3. The communication device of claim 1, wherein the maximum limit number of CBGs is received in a radio resource control (RRC) signaling.

4. The communication device of claim 1, wherein the maximum limit number of CBGs for an uplink (UL) is a first value, and the maximum limit number of CBGs for a downlink (DL) is a second value.

5. The communication device of claim 1, wherein the maximum limit number of CBGs for a first time period is a first value, and the maximum limit number of CBGs for a second time period is a second value.

6. The communication device of claim 1, wherein the size of the CBG field is the same as the maximum limit number of CBGs.

7. The communication device of claim 1, wherein the instructions further comprise:
   receiving a second DCI indicating a location of the first DCI from the network.

8. The communication device of claim 7, wherein the first DCI is received in a physical DL shared channel (PDSCH), and the second DCI is received in a physical DL control channel (PDCCH).

9. The communication device of claim 1, wherein the first DCI is received in a PDCCH.

10. The communication device of claim 1, wherein the instructions further comprise:
    obtaining an actual number of CBGs according to a predetermined rule; and
    performing the at least one CBG-based communication operation with the network according to the maximum limit number of CBGs and the actual number of CBGs.

11. The communication device of claim 10, wherein the predetermined rule comprises at least one of a size of the TB, a number of CBs in the TB, the maximum limit number of CBGs, a user equipment (UE) category of the communication device, a UE capability of the communication device, a transmission numerology, a subcarrier spacing, a number of bandwidth parts and a system bandwidth.

12. The communication device of claim 10, wherein the predetermined rule comprises a minimum of a number of CBs in the TB and the maximum limit number of CBGs.

13. The communication device of claim 1, wherein the instruction of performing the at least one CBG-based communication operation with the network according to the maximum limit number of CBGs and the CBG field comprises:
    transmitting a hybrid automatic repeat request (HARQ) feedback with a HARQ feedback payload size related to the maximum limit number of CBGs to the network, wherein the HARQ feedback indicates at least one decoding result of at least one CBG in the TB.

14. The communication device of claim 13, wherein the HARQ feedback payload size is the same as the maximum limit number of CBGs.

15. The communication device of claim 13, wherein the HARQ feedback payload size is obtained according to the maximum limit number of CBGs and a number of a plurality of TBs in a HARQ process, if the HARQ process comprises the plurality of TBs.

16. The communication device of claim 13, wherein a plurality of bits of the HARQ feedback for the TB is arranged contiguously.

17. The communication device of claim 13, wherein the rest of the HARQ feedback is padded with at least one bit or is reserved, if an actual number of CBGs is smaller than the maximum limit number of CBGs.

18. The communication device of claim 17, wherein the at least one bit comprises only at least one bit "1", comprises only at least one bit "0", comprises only at least one bit indicating "NACK", or comprises only at least one bit indicating "ACK".

19. The communication device of claim 1, wherein the instruction of performing the at least one CBG-based communication operation with the network according to the maximum limit number of CBGs and the CBG field comprises:
transmitting a plurality of HARQ feedbacks with a plurality of HARQ feedback payload sizes related to a plurality of maximum numbers of CBGs to the network, wherein the plurality of HARQ feedbacks indicate a plurality of decoding results of a plurality of TBs and are transmitted according to a plurality of contiguous HARQ feedback indices of the plurality of HARQ feedbacks.

20. The communication device of claim 1, wherein the TB comprises at least one CBG, and the instruction of performing the at least one CBG-based communication operation with the network according to the maximum limit number of CBGs and the CBG field comprises:
decoding all the at least one CBG in the TB correctly;
performing a cyclic redundancy check (CRC) on the TB incorrectly; and
transmitting at least one negative acknowledgement (NACK) corresponding to the at least one CBG to the network in response to the TB.

21. The communication device of claim 1, wherein the maximum limit number of CBGs is applied to a plurality of TBs in the at least one CBG-based communication operation, if the plurality of TBs are comprised in a HARQ process.

22. A network for handling a code block group (CBG)-based communication operation, comprising:
at least one storage device; and
at least one processing circuit, coupled to the at least one storage device, wherein the at least one storage device stores instructions, and the at least one processing circuit is configured to execute the instructions of:
transmitting an indication configuring at least one CBG-based communication operation to a communication device;
transmitting a maximum limit number of CBGs in a transport block (TB) for the at least one CBG-based communication operation;
obtaining a size of a CBG field according to the maximum limit number of CBGs;
transmitting the CBG field with the size of the CBG field in a first DL control information (DCI) to the communication device, after obtaining the size of the CBG field, wherein the CBG field indicates at least one transmitted CBG; and
performing the at least one CBG-based communication operation with the communication device according to the maximum limit number of CBGs and the CBG field.

23. The network of claim 22, wherein the at least one CBG-based communication operation comprises a transmission of a physical DL shared channel (PDSCH), or the at least one CBG-based communication operation comprises a reception of a physical UL shared channel (PUSCH).

24. The network of claim 22, wherein the maximum limit number of CBGs is transmitted in a radio resource control (RRC) signaling.

25. The network of claim 22, wherein the maximum limit number of CBGs for an uplink (UL) is a first value, and the maximum limit number of CBGs for a downlink (DL) is a second value.

26. The network of claim 22, wherein the maximum limit number of CBGs for a first time period is a first value, and the maximum limit number of CBGs for a second time period is a second value.

27. The network of claim 22, wherein the size of the CBG field is the same as the maximum limit number of CBGs.

28. The network of claim 22, wherein the instructions further comprise:
transmitting a second DCI indicating a location of the first DCI to the communication device.

29. The network of claim 28, wherein the first DCI is transmitted in a physical DL shared channel (PDSCH), and the second DCI is transmitted in a physical DL control channel (PDCCH).

30. The network of claim 22, wherein the first DCI is transmitted in a PDCCH.

31. The network of claim 22, wherein the instructions further comprise:
obtaining an actual number of CBGs according to a predetermined rule; and
performing the at least one CBG-based communication operation with the communication device according to the maximum limit number of CBGs and the actual number of CBGs.

32. The network of claim 31, wherein the predetermined rule comprises at least one of a size of the TB, a number of CBs in the TB, the maximum limit number of CBGs, a user equipment (UE) category of the communication device, a UE capability of the communication device, a transmission numerology, a subcarrier spacing, a number of bandwidth parts and a system bandwidth.

33. The network of claim 31, wherein the predetermined rule comprises a minimum of a number of CBs in the TB and the maximum limit number of CBGs.

34. The network of claim 22, wherein the instruction of performing the at least one CBG-based communication operation with the communication device according to the maximum limit number of CBGs and the CBG field comprises:
receiving a hybrid automatic repeat request (HARQ) feedback with a HARQ feedback payload size related to the maximum limit number of CBGs from the communication device, wherein the HARQ feedback indicates at least one decoding result of at least one CBG in the TB.

35. The network of claim 34, wherein the HARQ feedback payload size is the same as the maximum limit number of CBGs.

36. The network of claim 34, wherein the HARQ feedback payload size is obtained according to the maximum limit number of CBGs and a number a plurality of TBs in a HARQ process, if the HARQ process comprises the plurality of TBs.

37. The network of claim 34, wherein a plurality of bits of the HARQ feedback for the TB is arranged contiguously.

38. The network of claim 34, wherein the rest of the HARQ feedback is padded with at least one bit or is reserved, if an actual number of CBGs is smaller than the maximum limit number of CBGs.

39. The network of claim 38, wherein the at least one bit comprises only at least one bit "1", comprises only at least one bit "0", comprises only at least one bit indicating "NACK", or comprises only at least one bit indicating "ACK".

40. The network of claim 22, wherein the instruction of performing the at least one CBG-based communication operation with the communication device according to the maximum limit number of CBGs and the CBG field comprises:
   receiving a plurality of HARQ feedbacks with a plurality of HARQ feedback payload sizes related to a plurality of maximum numbers of CBGs from the communication device, wherein the plurality of HARQ feedbacks indicate a plurality of decoding results of a plurality of TBs and are received according to a plurality of contiguous HARQ feedback indices of the plurality of HARQ feedbacks.

41. The network of claim 22, wherein the maximum limit number of CBGs is applied to a plurality of TBs in the at least one CBG-based communication operation, if the plurality of TBs are comprised in a HARQ process.

* * * * *